United States Patent [19]

Rexroth

[11] 4,321,023
[45] Mar. 23, 1982

[54] MACHINE FOR MAKING STRUDEL LEAF, DOUGH SHEETS

[75] Inventor: Klaus W. O. Rexroth, Northvale, N.J.

[73] Assignee: Everex Corporation, Dumont, N.J.

[21] Appl. No.: 502,216

[22] Filed: Aug. 30, 1974

Related U.S. Application Data

[63] Continuation-in-part of Ser. No. 360,923, May 16, 1973, abandoned.

[51] Int. Cl.³ .............................................. A21C 3/02
[52] U.S. Cl. ..................................... 425/66; 425/296; 425/404
[58] Field of Search ................. 425/66, 215, 296, 371, 425/404; 26/54 R, 54 B, 57 R, 60; 426/496, 502, 391; 242/66; 99/451, 474, 477, 483; 34/158, 155

[56] References Cited

U.S. PATENT DOCUMENTS

| | | | |
|---|---|---|---|
| 2,892,422 | 6/1959 | Casale | 425/383 X |
| 3,235,931 | 2/1966 | Bruckner | 26/60 X |
| 3,503,134 | 3/1970 | Fleissner | 34/158 X |
| 3,577,586 | 5/1971 | Kalwaltes | 425/66 X |
| 3,744,404 | 7/1973 | Eisendrath et al. | 425/297 |
| 3,930,769 | 1/1976 | Gunther | 425/66 X |

*Primary Examiner*—William R. Briggs

[57] ABSTRACT

A machine for making strudel leaf, dough sheets having a series of pressure rollers for thinning a wad of stretchable dough, a lower support belt for supporting the dough wad, a pair of upper and lower diverging belts which grab the edges of the thinned wad and stretch the dough into thin sheets, a drying chamber for drying the dough and a receiving drum on which the leaf is wound after drying.

10 Claims, 8 Drawing Figures

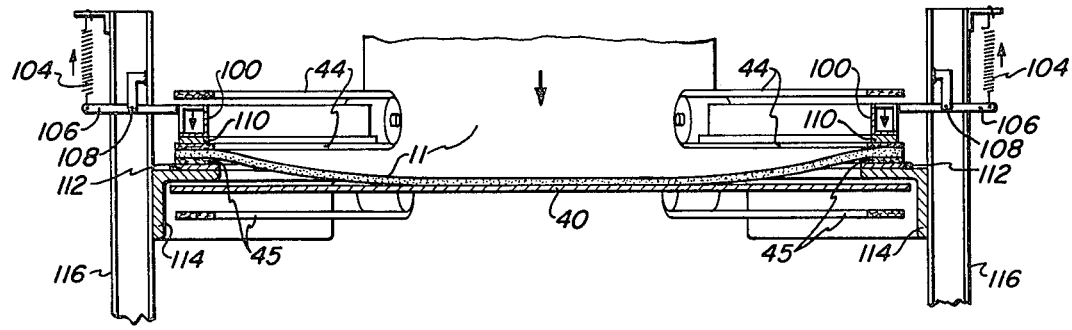
FIG. 4
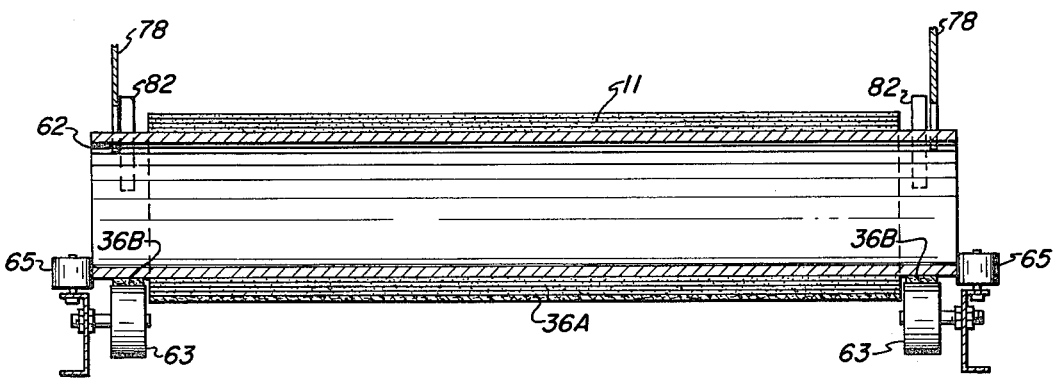
FIG. 6
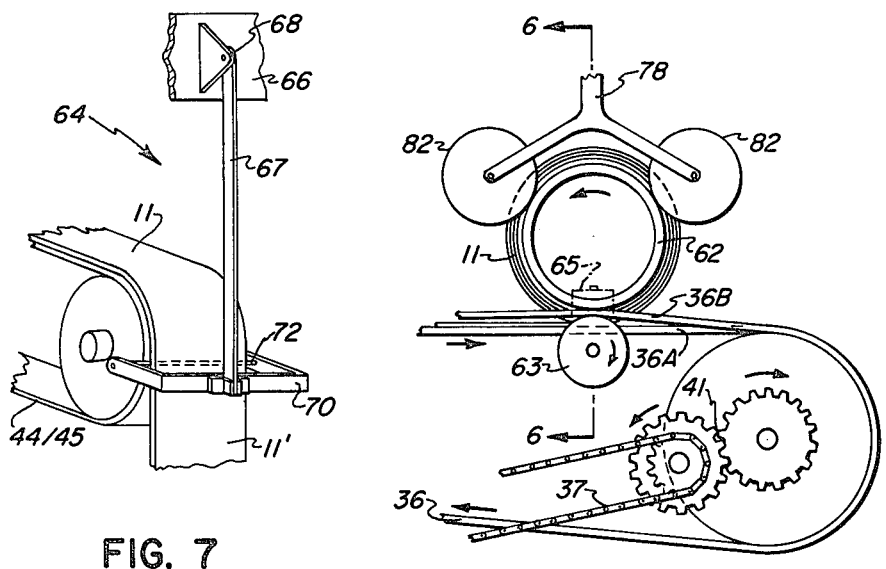
FIG. 7
FIG. 5

MACHINE FOR MAKING STRUDEL LEAF, DOUGH SHEETS

This application is a continuation-in-part of my copending application, Ser. No. 360,923, filled May 16, 1973, now abandoned.

The invention relates to a machine for making strudel leaf, dough sheets from a wad of stretchable dough. In particular, the invention is directed toward providing a machine in which each of the opposed edges of a wad of stretchable dough is engaged between an upper belt and a lower belt. The belts diverge in the direction of motion of the dough through the machine to thereby stretch the dough into a thin leaf usable for strudel and other thin dough, baked goods. To facilitate stretching of the dough without tearing, prior to delivering it to the diverging belts, the speed of travel is increased as the dough wad proceeds from its entry into the machine toward the diverging belts.

It is an important object of the invention to provide a machine for making strudel leaf, dough sheets on a production basis.

It is a further object of the invention to provide such a machine which is simple in operation and economical to use.

It is a still further object of the invention to provide such a machine wherein the dough is stretched transversely by a pair of upper and a pair of lower diverging belts.

It is yet another object of the invention to provide such a machine wherein the stretched sheet is supported on a table having a low friction surface to thereby prevent tearing of the sheet while it is being stretched.

These and other objects, advantages, features and uses will be apparent during the course of the following discussion when taken in conjunction with the accompanying drawings, wherein:

FIGS. 1 and 1A, joined on lines A—A, together form a simplified, side elevational view of a machine of the invention;

FIG. 4 is a sectional view taken on lines 4—4 of FIG. 2, viewed in the direction of the arrows 4;

FIG. 5 is an elevational view of the discharge end of the machine of FIGS. 1 and 1A, showing the means for driving the collecting drum;

FIG. 6 is a sectional view, taken along lines 6—6 of FIG. 5, viewed in the direction of the arrows; and FIG. 7 is a perspective view of the scraper used to remove the excess dough from the output ends of the diverging belts.

Figure 2:
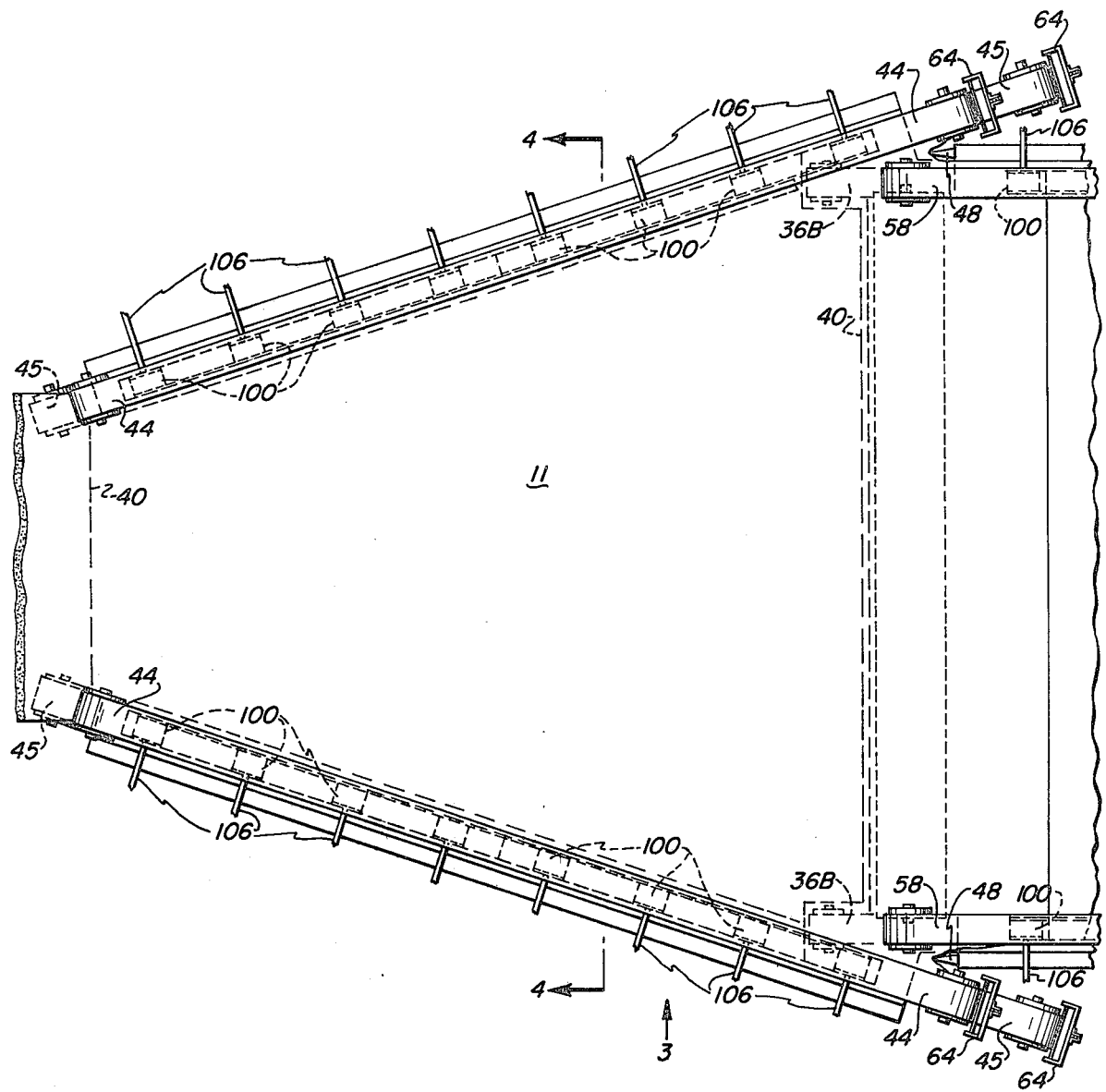
FIG. 2 is an enlarged, horizontal, plan view of the portion of the machine wherein the wad of dough is stretched into a thin sheet.

In the drawing, wherein, for the purpose of illustration, there is shown a preferred embodiment of the invention, the numeral 10 designates a machine of the invention, generally. The input end of machine 10 is seen to comprise a first drive belt 14 which receives a wad of somewhat thinned dough 11 from a hopper 12.

A drive motor 16 is connected to a plurality of gear boxes 20-1, 20-2, and 20-3 which, in turn drive sheeter head assemblies 22-1, 22-2 and 22-3. Belt 14 is driven from sheeter head assembly 22-1. The controls (details not shown) of the sheeter head assemblies are adjusted so that belt 14 runs at the lowest speed, belt 24-1 runs at slightly increased speed, belt 24-2 runs at further increased speed and belt 24-3 runs at the highest speed. This effectively thins the wad 11 as it proceeds through the machine. Roller pairs 26-1 and 27-1, 26-2 and 27-2 and 26-3 and 27-3 are appropriately spaced apart in a vertical direction to serve to apply the appropriate pressure to thereby aid in thinning the wad 11 as it proceeds through the machine. The rollers 26-1 and 27-1 are furthest apart, rollers 26-2 and 27-2 are closer together and rollers 26-3 and 27-3 are closest together.

To prevent the dough from sticking to the belts with the resulting tearing, starch is applied to the top surface of the wad from hoppers 28-1, 28-2 and 28-3. Starch is also applied to the bottom surface of the dough sheet from boxes 30-1, 30-2, 30-3 and 30-4 which apply starch to belts 14, 24-1, 24-2 and 24-3, respectively, as the belts run through the boxes. Small stirring wheels 31 are mounted in the boxes 30 to keep the starch from agglomerating (details not shown).

The wad 11 is next delivered to stretching section 34. Prior to being delivered to the stretching section, the edges of dough 11 are trimmed by a pair of wheel cutters 32 (one at each side of the machine). Stretching section 34 is provided with a support table 40 having a top surface of low-friction material such as a smooth plastic. The dough wad slides smoothly on the support table with a minimum of tearing as the dough wad proceeds through the machine. A pair of upper diverging belts 44 (FIGS. 2 and 3) cooperate with a pair of lower diverging belts 45 to grasp and gently stretch the dough sheet transversely as the sheet proceeds through the machine. Drive for the diverging belts is provided by a combined variable speed motor and speed reducer 38 and chain 39.

To maintain good pressure between belts 44 and 45 and thereby hold the product firmly between the belts as it is stretched by the machine, auxiliary pressure elements 100 are provided. Preferably, the pressure elements are spaced along an angle iron 102 and are biased to produce downward pressure on the lower length of belt 44 by means of a spring 104 and an arm 106 which is pivoted at 108. Similar sets of auxiliary pressure elements 100, utilizing the same construction, are used to apply pressure to the inner surfaces of the forward moving portions of belts 58 (FIGS. 2 and 3).

A strip 110 having a smooth surface of plastic or similar material is bonded to pressure element 100. Strip 110 pushes dough 11 against a similar smooth strip 112 which is bonded to support angle 114 and which bears against the inner surface of the forward moving portion of lower belt 45. The underside of the forward moving portion of belt 45 is supported by a rigid member 114 which is affixed to the machine frame 116. If it is necessary to clean material from the belt, the operator can press down on arm 106 to overcome the spring bias. Then the pressure element 100 is lifted off the belt to thereby make the belt surface available for access by the operator.

Figures 1, 1A:
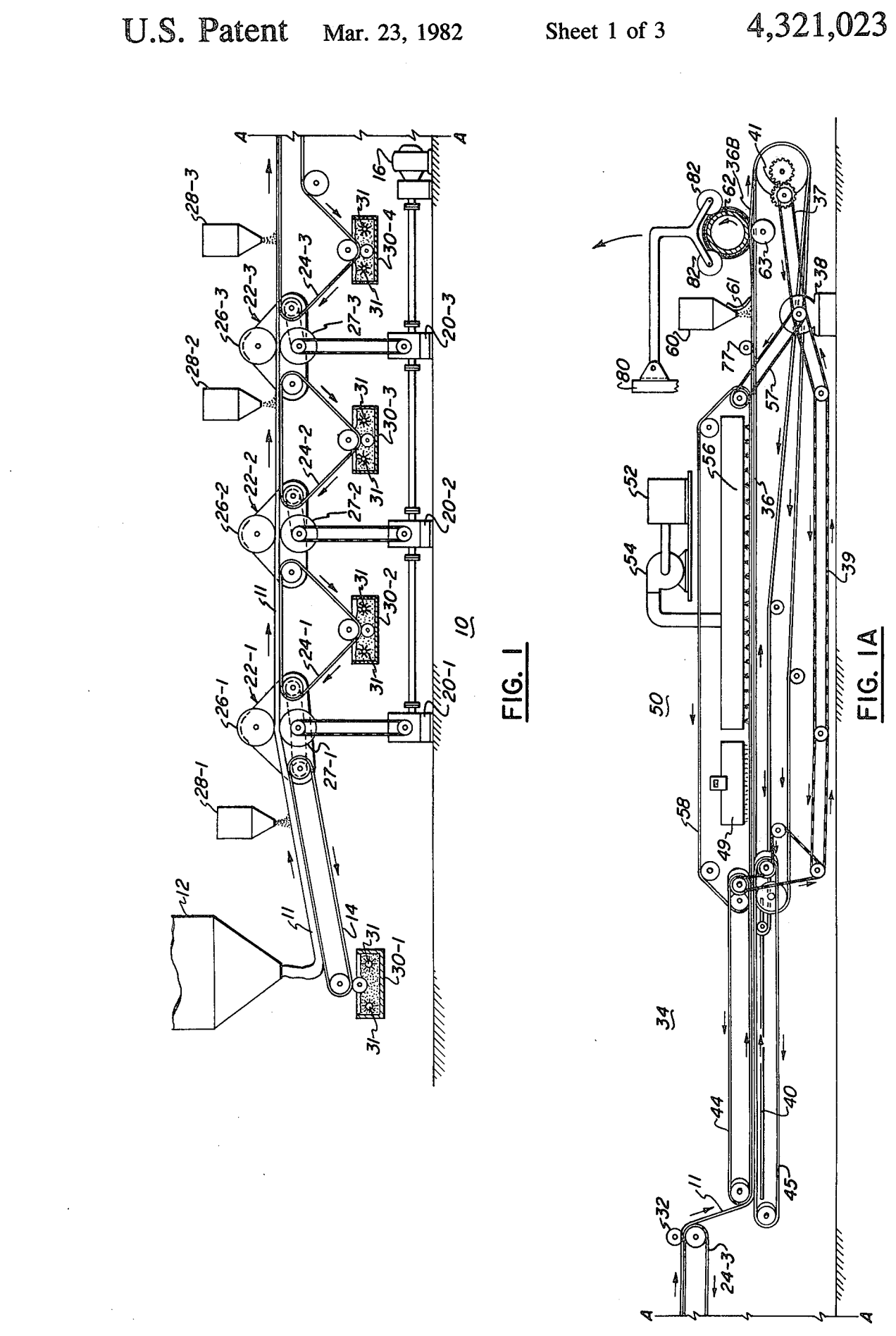

The sheet next proceeds toward the drier section 50. Prior to entering the drier section, the edges of the sheet are trimmed by cutters 48 (FIG. 2). The drier section 50 comprises an infrared heater 49, a heater 52, a blower 54 and air boxes 56. The infrared heater is used to accelerate the drying process as the wad is fed through the drier section. Warmed air from heater 52 is blown onto the upper surface of the dough sheet as it proceeds through the drier section 50. A pair of upper belts 58 (one at each edge of the dough sheet) cooperate with a lower belt 36 to control the travel of the dough sheet through the drier. The belts 58 are driven by variable speed motor and speed reducer 38 and chains 57 (one at each side of the machine) and main belt 36 is driven by motor 38 and chain 37 and reversing members 41, shown in FIG. 1A as gears. After the sheet leaves the drier, it is trimmed by cutters 77 (one at each edge of the sheet), starch is applied to its upper surface from hopper 60 and the excess is restrained from advancing with the dough sheet by a flexible wiper 61. The sheet is then wound on a drum or roller 62. The operator starts the feeding of the dough sheet onto drum 62 and the dough then feeds onto the drum as will appear further in this description.

Figure 3:
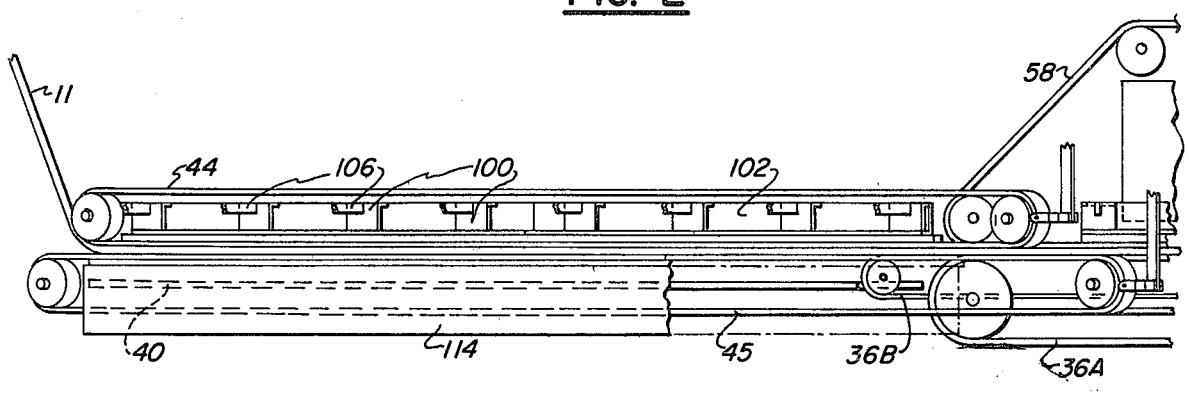
FIG. 3 is an elevational view viewed in the direction of arrow 3 of FIG. 2.

Main belt 36 comprises three belts, namely a large central belt 36A and two side belts 36B (FIGS. 2 and 6). Main belt 36 is so divided because of the belt wear experienced from the friction between drum 62 and the drive belt. Belts 36B are pushed into contact with drum 62 by idler rollers 63 and drum 62 is kept in horizontal alignment by means of guide roller 65. Since the wear is confined to the side belts, they have to be changed much more frequently than belt 36A. Consequently, there is considerable saving in belt cost.

In FIG. 7, there is illustrated means for removing the excess dough from the delivery or exit ends of the diverging belts 44 and 45. There is one such means 64 associated with each belt 44 and 45. The device 64 is mounted on a vertical support 66 such as the machine frame and includes a vertical member 67 which is pivoted as shown at 68. At the lower end of vertical member 67 there is mounted a U-shaped frame 70 across the open end of which, a high strength wire 72 is tightly strung. Wire 72 is in contact with the belt so that the excess dough 11' from sheet 11 is scraped from the belts as shown in the figure and drops into a waste or collection bin (not shown).

FIGS. 5 and 6 illustrate the construction associated with drum 62. The ends of drum 62 are supported by belts 36B and rollers 63. Belt 36 runs over the rollers 63 so that the belt is sufficiently in contact with drum 62 to permit it to be driven by the belt. The feed of the dough sheet 11 is started by hand and once it is so commenced, the sheet continues to be pulled onto the roller as the belt 36 drives it. Drum 62 is made hollow so that it will be as light as possible.

To guide drum 62 as it rotates, a pair of upper guides 78 (one at each end of the roller) are mounted to the frame as shown at 80 or to a stanchion or other fixed member. The guides 78 each comprise a pair of rollers 82 which bear against drum 62 and keep it in position.

When the drum 62 is full, it is removed to the packaging area where the sheet is removed from the roller and the dough is packaged ready for delivery to customers. When one drum 62 is removed, a second roller is placed in position and the feed of dough onto it is commenced by hand.

While a particular embodiment of the invention has been shown and described, it is apparent to those skilled in the art that modifications are possible without departing from the spirit of the invention or the scope of the subjoined claims.

The embodiments of the invention in which an exclusive property or privilege is claimed are defined as follows.

1. A machine for making strudel leaf, dough sheets from a wad of stretchable dough comprising:

thinning means for thinning the wad of stretchable dough as the dough moves through the machine;

a pair of transversely spaced, lower diverging belts mounted under the upper belts, all located beyond the thinning means in the direction of motion of the dough, so that each edge of the thinned wad of stretchable dough will be captured between an upper belt and a lower belt;

driving means for driving the diverging belts to thereby stretch the dough in a direction transverse to the direction of motion of the diverging belts to thereby produce a thin leaf of dough at the delivery ends of the diverging belts;

first pressure means operatively associated with the diverging belts for maintaining sufficient pressure between the upper and the lower diverging belts to hold the edges of the thinned wad of stretchable dough firmly therebetween as the dough is stretched in said transverse direction;

a drier located beyond the diverging belts in the direction of motion of the dough;

two pairs of further belts located beyond the diverging belts for gripping the thin leaf of dough therebetween and movable through the drier to thereby move the thin leaf of dough through the drier;

second pressure means operatively associated with the further belts for maintaining sufficient pressure between the two pairs of further belts to enable gripping and retention of the thin leaf of dough between the two pairs of belts as the thin leaf of dough passes through the drier;

support means mounted below the path of movement of the dough for supporting the dough, said support means extending, in the direction of movement of the dough, between the pairs of diverging belts and between the two pairs of further belts, the support means including first means extending between the pairs of diverging belts and second means extending between the two pairs of further belts; and means for trimming excess dough from the thin leaf at the end of the pairs of diverging belts adjacent the corresponding end of the two pairs of further belts such that the thin leaf of dough is within the confines of the two pairs of further belts.

2. A machine for making strudel leaf, dough sheets from a wad of stretchable dough comprising:

thinning means for thinning the wad of stretchable dough as the dough moves through the machine;

a pair of transversely spaced, upper diverging belts and a pair of transversely spaced, lower diverging belts mounted under the upper belts, all located beyond the thinning means in the direction of motion of the dough, so that each edge of the thinned wad of stretchable dough will be captured between an upper belt and a lower belt;

driving means for driving the diverging belts to thereby stretch the dough in a direction transverse to the direction of motion of the diverging belts to thereby produce a thin leaf of dough at the delivery ends of the diverging belts;

first pressure means operatively associated with the diverging belts for maintaining sufficient pressure between the upper and the lower diverging belts to hold the edges of the thinned wad of stretchable dough firmly therebetween as the dough is stretched in said transverse direction;

a drier located beyond the diverging belts in the direction of motion of the dough;

two pairs of further belts located beyond the diverging belts for gripping the thin leaf of dough therebetween and movable through the drier to thereby move the thin leaf of dough through the drier;

second pressure means operatively associated with the further belts for maintaining sufficient pressure between the two pairs of further belts to enable gripping and retention of the thin leaf of dough between the two pairs of belts as the thin leaf of dough passes through the drier; and support means mounted below the path of movement of the dough for supporting the dough, said support means extending, in the direction of movement of the dough, between the pairs of diverging belts and between the two pairs of further belts, the support means including first means extending between the pairs of diverging belts and second means extending between the two pairs of further belts;

said drier including an infrared drier element positioned so as to direct heat toward the upper surface of the thin leaf of dough; and an air box mounted such that hot air is directed toward the thin leaf of dough after the thin leaf of dough has been subjected to the heat from the infrared drier.

3. The invention of claim 2 including:

means located beyond the drier for receiving the dried thin leaf of dough from the drier.

4. The invention of claim 3 wherein:

the support means is formed of material having low friction surfaces.

5. The invention of claim 4 wherein said first pressure means comprises:

a plurality of spring biased elements which bear against the inner surface of the lower portion of each of the upper diverging belts.

6. The invention of claim 5 wherein said second pressure means comprises:

a plurality of spring biased elements which bear against the inner surface of the lower portion of each of the upper diverging belts.

7. The invention of claim 2 including removing means located so as to remove excess dough from the delivery ends of the diverging belts.

8. The invention of claim 7 wherein the removing means comprises a tightly drawn wire mounted adjacent the delivery end of a belt and in contact therewith whereby the excess dough adhering to the belt is scraped therefrom.

9. The invention of claim 3 wherein the means located beyond the drier for receiving the dried thin leaf of dough from the drier includes:

a drum; p1 supporting means supporting the drum for rotation such that the dried thin leaf of dough will be wound upon the drum; and means enabling selective removal of the drum, with the dried thin leaf of dough wound thereon, from the machine for subsequent removal of the dough from the drum remote from the machine.

10. The invention of claim 9 wherein the drum is hollow for relative light weight.

* * * * *